US005210179A

United States Patent [19]
Stewart

[11] Patent Number: 5,210,179
[45] Date of Patent: May 11, 1993

[54] PROCESS FOR THE PRODUCTION OF POLYETHERS DERIVED FROM OXETANES

[75] Inventor: Malcolm J. Stewart, Henlow, England

[73] Assignee: The Secretary of State for Defense in her Britannic Majesty's Government of the United Kingdom of Great Britain and Northern Ireland, London, England

[21] Appl. No.: 820,624

[22] PCT Filed: May 30, 1990

[86] PCT No.: PCT/GB90/00838
  § 371 Date: Jan. 28, 1992
  § 102(e) Date: Jan. 28, 1992

[87] PCT Pub. No.: WO90/15093
  PCT Pub. Date: Dec. 13, 1990

[30] Foreign Application Priority Data
  May 31, 1989 [GB] United Kingdom ............... 8912457

[51] Int. Cl.$^5$ .................... C08G 65/10; C08G 65/18; C08G 65/20; C07C 43/11

[52] U.S. Cl. ................................. 528/408; 528/403; 528/409; 528/417; 528/421; 528/361; 528/362

[58] Field of Search ............... 528/403, 408, 409, 417, 528/421, 361, 362; 260/695

[56] References Cited

U.S. PATENT DOCUMENTS 4,707,540 11/1987 Manser et al. ................ 528/417
4,764,586 8/1988 Maner et al. ................. 528/417
5,099,042 3/1992 Wardle et al. ................ 528/417

Primary Examiner—John Kight, III
Assistant Examiner—Richard Jones
Attorney, Agent, or Firm—Nixon & Vanderhye

[57] ABSTRACT

Hydroxyterminated prepolymers, used in curing reactions with isocyanates to produce elastomers, are prepared by continuously adding over periods of 12-50 hours an oxetane monomer to a reaction mixture containing a diol initiator and a catalyst capable of catalyzing the cationic quasi-living cationic polymerization of the monomer, the rate of addition to maintain stoichiometric excess over the monomer. Polymerization is terminated by adding brine. Polymers of increased molecular weight and reduced impurity levels result.

7 Claims, No Drawings

PROCESS FOR THE PRODUCTION OF POLYETHERS DERIVED FROM OXETANES

The present invention relates to the production of polyethers derived from oxetanes using cationic polymerization initiators. The polyethers are an important class of polymers finding application as detergents, disinfectants, absorbents and elastomer prepolymers amongst other uses. For many of these uses it is highly desirable to produce a pure product of controlled molecular weight and controlled polydispersity.

The cationic polymerization of oxetanes involves the opening of the heterocyclic oxetane ring under catalytic conditions. This mechanism of polymerization is described in U.S. Pat. No. 4393100 (Manser). The catalyst described by Manser combines with a preinitiator precursor to form an adduct capable of forming a cationic initiator with the oxetane monomer. Polymer chains are built up as oxetane molecules add on to the reactive end groups of the initiator molecules, the number of such chains being proportional to the number of preinitiator precursor molecules present.

In the process described in U.S. Pat. No. 4393199, the preinitiator precursor followed by the catalyst are added to bulk solutions of the oxetane. In some examples, the precursor is first added to the catalyst to form the adduct which is then added to the bulk solution of monomer. Principal examples given of the precursor and catalyst are, respectively, 1,4-butane diol (a difunctional alcohol) and boron trifluoride etherate, the diol replacing the ether to give the active adduct. A catalyst-to-diol molar ratio of at least 1.5:1 was found necessary to polymerise the monomer, whereas at a ratio of 3:1 and higher, loss of polymer molecular weight control occurred and the polydispersivity of the product become much higher. However, within the preferred catalyst-to-diol molar ratio of from 1.5:1 to less than 3:1, the yield of polymer was only 63-68% when using 1,4-butane diol as the precursor, indicating the presence of significant amounts of impurities in the product.

A further example of this process of polymerization as applied to 3-nitratomethyl, 3-methyloxetane (NIMMO) is provided in a technical report by Morton Thiokol (Defence Technical Information Centre publication No. 85837, Defence Logistics Agency, Cameron Station, Alexandria, Va., page E4 to E5.) This document relates to a bulk reaction polymerization of NIMMO using the methods of U.S. Pat. No. 4393199 and provides a product containing about 25% impurity.

The present invention seeks to provide an improved process for the production of polyethers by quasi-living cationic polymerization of oxetanes which provides products of increased reproducibility, reduced impurity levels and more complete control of molecular weight.

Accordingly, the present invention provides a process for the polymerization of oxetanes monomers comprising the steps of (a) mixing together a catalyst capable of catalysing the cationic polymerization of the monomer with a preinitiator precursor to yield an active adduct of the catalyst and precursor, (b) bringing the adduct into contact with the monomer so as to cause the adduct to form an initiating species with the monomer and thereafter undergo chain extension polymerization with further of said monomer, and (c) allowing the polymerization to proceed substantially to completion, wherein step (b) is performed by slowly adding the monomer at a controlled rate to a quantity of the adduct in solution over a period of several hours.

The rate of addition is preferably such that the catalyst is always in stoichiometric excess over the monomer. Advantageously the rate of the polymerization of the monomer in the presence of the catalyst is first determined and the rate of addition is set such that it is slower than this so that the catalyst remains in stoichiometric excess.

Whereas the prior art process of Manser uses the initial stoichiometry and the reaction temperature to provide molecular weight control the present process adds monomer at a rate such that the ratio of the monomer to the catalyst does not exceed levels known to produce cyclic oligomerisation. On completion of monomer addition the polymerization is allowed to continue for a time, typically several hours, for example three hours.

The monomer is added over a period of several hours, preferably over 12 hours or more, more preferably over 16 hours or more and particularly over 18 hours or more, with a maximum preferred time of 50 hours. It has been found that by slowly adding the monomer to the reaction mixture, an advantageous increase in molecular weight in the product is observed but, unlike the process described in U.S. Pat. No. 4393199, without an associated increase in polydispersivity.

The controlled addition of monomer in the process of the invention also affects the level of impurities in the product. If a bulk reaction is used to polymerise NIMMO as in the DTIC report about 25% of the product will comprise impurity other than the desired polymer as measured by NMR and gel permeation chromatography. Using the method of the present invention the impurities are reduced to 15% with the possibility of 5% being achieved if addition is carried out over a period of over 18 hours.

The effect of impurities on the polymer properties is very dependent on the nature of the impurity present. Generally oligomers tend to act as plasticisers and lower the glass transition temperature ($T_g$) of cured, estomeric products of the reaction between polyethers of this type and suitable curing agents (for example, isocyanates), and quite often oligomer impurities can also adversely affect the cure. Small molecule impurities normally give a less favourable result since they can undergo reactions which rapidly degrade the polymer. This is particularly important with the production of polymers of nitratoalkyl-substituted oxetanes such as polyNIMMO since the monomer and other impurities degrade rapidly with time and autocatalytically degrade the polymer.

The type of impurity produced in the known batch reaction tends to comprise of unacceptably high levels of unreacted monomers and other small molecule products which can represent up to 30% of the isolated products with about 20% being oligomers. By contrast, the present process when applied to polyNIMMO improves on this purity significantly, providing a level of 5% impurities comprising of about 4% higher molecular weight oligomer impurities, which have less effect on the characteristics of the product, and only about 1% small molecule impurities.

The catalyst used in the process of the present invention is preferably borontrifluoride etherate and is used in conjunction with diols or triols as a preinitiator precursor but many others may be employed, for example $AgPF_6$ or $AgSbF_6$ may be used with organic bromides (e.g., m- or p-xylilene dibromide); or HBF$_4$ etherate may also be used with diols and triols. All catalysts are used in anhydrous form and nitrogen atmosphere is advantageously employed in the reaction vessel to maintain this. It is a feature of the reaction that difunctional or trifunctional polymers may be produced by employing di- or trifunctional agents in the preinitiator (e.g., diols or triols or bromides.)

The ratio of the initiator components has also been found to affect the molecular weight of the product. Where a preinitiator is used care must be taken not to have an excess of its functional groups over the catalyst moieties or termination of the polymer will occur prematurely. The preinitiator precursor may be a diol or triol, in which case the molar ratio of hydroxy groups in the diol or triol to catalyst is preferably from 1:0.75 to 1:2.5, preferably from 1:1 to 1:1.5. With the borontrifluoride etherate: butan-1,4-diol system an excess of the borontrifluoride over the diol of in the molar ratio of at least 1.5:1, preferably at least 2:1, is essential to avoid premature termination of the polymerization reaction. The higher the ratio of borontrifluride to diol the higher the molecular weight of the product. Thus by increasing the borontrifluoride: diol ratio from 2:1 to 5:1 (with 3:1 being the preferred upper limit) a proportional increase in molecular weight ensues.

The temperature of the reaction affects the polydispersity of the product such that operation at, for example, 20° C. will give a broad range of polyNIMMO molecular weights whereas −20° C. will give a much narrower range. Due to the very low impractical polymerization rate achieved at −20° C. which would necessitate extremely slow rates of monomer addition, it is preferred to employ a temperature of 0° C. which gives a sufficiently narrow weight range with a good polymerisation rate.

Generally both the monomer and the catalyst are used as solutions in a suitable solvent. The solvent used affects the reaction such the increasing polarity increases side reactions. Hydrocarbon solvents such as toluene give the best results with regard to purity but the preferred solvent for a combination of good rate with good purity is a halogenated hydrocarbon, preferably dichloromethane. Typically 20% w/w monomer and catalyst solutions are used although other concentrations of up to 50% may be used.

The present polymerization is preferably performed in an apparatus comprising a reaction vessel provided with a monomer feed line including a controlling device for adjusting the rate of addition of monomer such that it may be added continuously at a rate such that the ratio of catalyst to monomer is at a controlled level at any one time. The control device preferably acts to achieve a pumped flow of monomer into the vessel.

It is preferred to achieve the addition of the monomer in this apparatus by use of a pump acting upon the feed line from a monomer supply to the reaction vessel. Preferably the pump is electrically powered for ease of control.

PROTOCOL

A typically protocol for a polymerization according to the present invention involves the cooling of the reaction vessel at 0° C. under nitrogen gas and injecting the preinitiator precursor and solvent, if used, into it. The catalyst precursor is added over several minutes and the mixture stirred for about one hour to form the active adduct. For the butan-1,4-diol system three times its volume of dichloromethane solvent is used and the diol forms a precipitate in this. The borontrifluoride etherate is added to the vessel with stirring over five minutes and the stirring continued over a period of one hour to dissolve the diol.

Preferably the monomer is added to the stirred reaction mixture over a period predicted to provide the product with the molecular weight desired via use of a pump in the feed line, e.g., a peristaltic pump acting on a flexible tube. The reaction is allowed to continue for a further period of several hours, typically three or four, before termination with an excess of brine. The organic layer is then washed with an aqueous base e.g., sodium hydrogen carbonate and then with water, then separated polymer product is isolated by drying the organic layer over calcium chloride and optionally mixing it with methanol to precipitate the polymer before evaporation and drying in a vacuum oven. (Methanol precipitation is not necessary with the present invention but may be employed if desired.)

The process of the present invention will now be illustrated by way of example only with reference to the following synthesis examples.

EXAMPLES

EXAMPLES (1-6)

The polymerisation of 3-nitratomethyl, 3-methyloxetane(NIMMO)

SAFETY NOTE: Owing to the explosion hazard associated with this monomer the polymerisation reaction should be undertaken in an armoured fume cupboard.

EXAMPLE 1

The preparation of difunctional polyNIMMO (crude).

The polymerisation reactor, which consisted of a 500 ml jacketed vessel equipped with a mechanical stirrer, nitrogen inlet/outlet, thermometer and serum cap was cooled from 120° C. to ambient temperatures under nitrogen. It was then connected to a cooling circulator and charged with a 25% w/v mixture of butane-1,4-diol in dichloromethane (3 g in 9 ml, 0.033 mol). The reactor was then cooled under nitrogen to 0° C. and a two fold excess of boron trifluoride etherate (9.44 g, 0.066 mol) was then added dropwise over a period of 10 minutes. After a delay of one hour to allow the initiatory complex to form, 20% w/v NIMMO in dichloromethane (75 g NIMMO in 375 ml dichloromethane) was pumped in at a constant flow rate over a period of 18 hours. When addition was complete a further polymerisation period of 4 hours was allowed before the reaction was terminated by the addition of a 20 fold excess of brine (24 g, 1.33 mol). The polymer was then isolated by washing the organic layer with aqueous sodium hydrogen carbonate solution, drying over calcium chloride, then removing the solvent on a rotary evaporator. The resultant tacky polymer was then dried at 50° C. for 60 hours in a vacuum oven. Yield was 71 g (95%). The crude product was shown to possess less than 4% oligomer and 1% small molecule impurities by $^1$H and $^{13}$C NMR along with dual detector gel permeation chromatography. The molecular weight of this polymer was $M_n$=6300, $M_w$=11000, $M_w/M_n$ (polydispersivity)=1.74.

EXAMPLE 2

The preparation of difunctional polyNIMMO (pure).

The polymerisation reactor was set up and charged with reagents and reactants as in Example 1 and as before was run over an addition period of 18 hours. After the further polymerisation period of 4 hours and brine termination step the polymer was isolated by washing the organic layer with aqueous sodium hydrogen carbonate solution, dried over calcium chloride and then precipitated into methanol. The resultant tacky polymer was then dried at 50° C. for 60 hours in a vacuum oven. Yield was 55 g (75%). The isolated product was free from all small molecule and oligomeric contaminants. The molecular weight of this polymer was $M_w=10800$, $M_n=7500$, $M_w/M_n=1.44$.

EXAMPLE 3

The preparation of difunctional polyNIMMO(variation).

The procedure used was exactly the same as in Example 1 except that tetrafluoroboric acid etherate (HBF$_4$) was used in place of the boron trifluoride etherate. There was also no need for the 1 hour wait for the initiatory complex to form. Conversion to 91% pure crude product was 97% isolated yield. Precipitation into methanol gave contaminated with less than 1% oligomer in a 78% yield.

EXAMPLE 4

The preparation of difunctional polyNIMMO (variation).

The procedure was exactly the same as Example 1 except that hexafluoroantimonic acid was used in place of the boron trifluoride etherate. There was also no need for the 1 hour wait for the initiatory complex to form. Conversion to an 87% pure crude product was 94% isolated yield. Precipitation into methanol gave product contaminated with less than 2% oligomer in 78% yield.

Typical molecular weights of the polymers of Example 3 and 4 were $M_w=9600$, $M_n=7300$, $M_w/M_n=1.31$.

EXAMPLE 5

The preparation of trifunctional polyNIMO.

The procedure was exactly the same as that of Example 1 except that metriol was used instead of butane-1,4-diol, a three-fold excess of boron trifluoride etherate was used and addition was over a 24 hour period. Conversion to a 94% pure crude was 93% isolated yield. Precipitation into methanol gave product contaminated with no oligomer in 75% yielded.

EXAMPLE 6

The preparation of trifunctional polyNIMMO (variation).

The procedure was exactly the same as that for Example 1 except that metriol was used instead of butane-1,4-diol, a three-fold excess of tetrafluoroboric acid etherate was used and addition was over a 24 hour period. Conversion to an 89% pure crude product was 98% isolated yield.

EXAMPLE 7

The preparation of trifunctional polyNIMMO (variation).

The procedure was exactly the same as that used in Example 1 except that metriol was used in place of butane-1,4-diol, a three-fold excess of hexafluoroantimonic acid was used and addition was over a 24 hour period. Conversion to an 83% pure crude product was 92% isolated yield. Precipitation into methanol gave product contaminated with less than 3% oligomer in 79% yield.

Typical molecular weights of the polymers of Examples 5 to 7 were $M_w=4900$, $M_n=3600$, $M_w/M_n=1.36$.

EXAMPLE 8-13

The polymerisation of oxetane(trimethylene oxide).

EXAMPLE 8

The preparation of difunctional polyoxetane.

The procedure was exactly the same as the used in Example 1 except that oxetane was used instead of NIMMO. The corresponding addition period was 12 hours. Conversion to a 96% pure crude product was 97% isolated yield. Precipitation into methanol gave product contaminated with no oligomer in 87% yield. The molecular weight of this polymer was $M_w=6350$, $M_n=3950$, $M_w/M_n=1.61$.

EXAMPLE 9

The preparation of difunctional polyoxetane (variation)

The procedure was exactly the same as that used in Example 3 except that oxetane was used instead of NIMMO. The corresponding addition period was 12 hours. conversion to a 93% pure crude product was 98% isolated yield. Precipitation into methanol gave product contaminated with no oligomer in 74% yield.

EXAMPLE 10

The preparation of difunctional polyoxetane (variation)

The procedure was exactly the same as Example 4 that oxetane was used instead of NIMMO. The corresponding addition period was 12 hours. Conversion to an 88% crude product was 93% isolated yield. Precipitation into methanol gave product contaminated with less than 2% oligomer in 69% yield.

Typical molecular weights of the polymers of Examples 9 and 10 were $M_w=5400$, $M_n=3450$, $M_w/M_n=1.56$.

EXAMPLE 11

The preparation of trifunctional polyoxetane.

The procedure was exactly the same as in Example 5 except that oxetane was used instead of NIMMO. The corresponding addition period was 16 hours. Conversion to a 92% pure crude product was 94% isolated yield. Precipitation into methanol gave product contaminated with no oligomer in 76% yield.

EXAMPLE 12

The preparation of trifunctional polyoxetane (variation)

The procedure was exactly the same as in Example 6 except that oxetane was used instead of NIMMO. The corresponding addition period was 16 hours. Conversion to an 87% pure crude product was 94% isolated yield. Precipitation into methanol gave a product contaminated with less than 3% oligomer in 80% yield.

EXAMPLE 13

The preparation of trifunctional polyoxetane (variation)

The procedure was exactly the same as in Example 7 except that oxetane was used instead of NIMMO. The corresponding addition period was 16 hours. Conversion to 84% pure crude product was 91% isolated yield. Precipitation into methanol gave product contaminated with less than 4% oligomer in 79 yield.

Typical molecular weights of the polymers of Examples 11 to 13 were $M_w=3800$, $M_n=2640$, $M_w/M_n=1.44$.

I claim:

1. Process for polymerizing an oxetane monomer comprising the steps of:
   (a) mixing together a substantially anhydrous catalyst capable of catalyzing the cationic polymerization of the monomer with a preinitiator precursor to yield an active adduct of the catalyst and precursor, wherein the molar ratio of catalyst to the functional groups of the preinitiator precursor is always at least 1:1;
   (b) adding the monomer to a quantity of the adduct in solution over a period of at least 12 hours to cause the adduct to form an initiating species with the monomer and thereafter undergo chain extension polymerization with further monomer; and
   (c) allowing the polymerization to proceed substantially to completion; and wherein steps (b) and (c) are each performed at a temperature of between +20 degrees C. and −20 degrees C.

2. The process according to claim 1 wherein the monomer is added to the adduct in step (b) over a period of at least 16 hours.

3. The process according to claim 1 wherein the monomer is added in step (b) so that the catalyst is always in stoichiometric excess over the monomer.

4. The process according to claim 1 wherein the preinitiator precursor is a diol or a triol.

5. The process according to claim 4 wherein the molar ratio of hydroxy groups in the diol or triol to catalyst is from 1:0.75 to 1:2.5.

6. The process according to claim 5 wherein the molar ratio of hydroxy groups in the diol or triol to catalyst is from 1:1 to 1:1.5.

7. The process according to claim 1 wherein the monomer is a nitratoalkyl-substituted oxetane.

* * * * *